(12) United States Patent
Huang et al.

(10) Patent No.: US 7,304,961 B2
(45) Date of Patent: *Dec. 4, 2007

(54) ECHO CANCELLATION DEVICE FOR FULL DUPLEX COMMUNICATION SYSTEMS

(75) Inventors: Chen-Chih Huang, Hsin-Chu Hsien (TW); Chih-Wen Huang, Kao-Hsiung Hsien (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 606 days.

This patent is subject to a terminal disclaimer.

(21) Appl. No.: 10/709,935

(22) Filed: Jun. 7, 2004

(65) Prior Publication Data

US 2005/0099966 A1 May 12, 2005

(30) Foreign Application Priority Data

Oct. 23, 2003 (TW) .............................. 92129469 A

(51) Int. Cl.
*H04B 3/20* (2006.01)
(52) U.S. Cl. .................. 370/286; 379/406.01
(58) Field of Classification Search .............. None
See application file for complete search history.

(56) References Cited

U.S. PATENT DOCUMENTS 5,694,474 A * 12/1997 Ngo et al. ............... 381/66
5,812,537 A 9/1998 Betts et al.
5,960,077 A * 9/1999 Ishii et al. ............ 379/406.08
6,373,908 B2 4/2002 Chan
6,775,529 B1 8/2004 Roo
6,947,478 B1 * 9/2005 Hauptmann et al. ........ 375/222
6,980,644 B1 * 12/2005 Sallaway et al. ........... 379/391
2002/0101983 A1 8/2002 Lee

FOREIGN PATENT DOCUMENTS

TW 318989 11/1997
TW 507433 10/2002

OTHER PUBLICATIONS

"15MHz, BIMOS Operational Amplifier with MOSFET Input/ CMOS Output.", HARRIS Semiconductor, Sep. 1998, pp. 1, 4, CA3130, CA3130A, No. 817.4., Harris Corporation 1998.

* cited by examiner

*Primary Examiner*—Ramnandan Singh
(74) *Attorney, Agent, or Firm*—Winston Hsu

(57) ABSTRACT

An echo cancellation device for a full duplex communications system is provided. The full duplex communication system has a transmitter for transmitting a transmit signal and a receiver for receiving a receive signal. The echo cancellation device has a filter for outputting a filter signal according to the transmit signal, an echo cancellation circuit connected to the filter for outputting an echo cancellation signal according to the filter signal, at least one echo cancellation resistor connected to the transmitter, the receiver, and the echo cancellation circuit, and an echo cancellation detection circuit for outputting a control signal according to an echo residue at the receiver to control the filter.

22 Claims, 7 Drawing Sheets

ECHO CANCELLATION DEVICE FOR FULL DUPLEX COMMUNICATION SYSTEMS

BACKGROUND OF INVENTION

1. Field of the Invention

The invention generally relates to a full duplex communication system, and more particularly, to an echo cancellation device for a full duplex communication system.

2. Description of the Prior Art

As technology advances, network usage is more and more popular. The requirement of network bandwidth is increasing and the transmission speed of data packets of Ethernet has risen from 10/100 Mps to 1 Gbps.

Please refer to FIG. 1, which is a block diagram of a 1 Gbps fast Ethernet system. In the 1 Gbps Ethernet system, each port has 4 channels 100 where each channel has a transceiver 102 and a line interface 116 electrically coupled to a twisted line 118. The transceiver 102 has a transmitter 104 and a receiver 106, wherein the transmitter 104 has a digital-to-analog converter (DAC) 108 to convert signals into analog form for transmitting to a far-end network device via the line interface 116 and the twisted line 118, and the receiver 106 has an analog front end (AFE) circuit for processing the received signal from the line interface 116 and an analog-to-digital converter (ADC) 114 for converting the processed signals into digital signals and then sending to the after circuits. The fast Ethernet and the far-end network device both simultaneously utilize the four channels where each channel simultaneously performs the transmitting and receiving operations. As a result, the fast Ethernet system is a full duplex communication system.

Each channel of the fast Ethernet system simultaneously performs the transmitting and receiving operations. When the channel is transmitting, the signals received from the channel are affected by the transmission and this phenomenon is known as echo impairment. In order to reduce echo impairment, an echo cancellation device 110 and an echo cancellation resistor Rp are usually disposed in the transmitter 104 as illustrated in FIG. 1. The echo cancellation device 100 is usually a digital-to-analog converter (DAC) to output a cancellation signal that is similar to the output signal from the DAC 108 so the cancellation signal can cancel the adverse effects on the receiver 106 by the transmitted signals to achieve echo cancellation.

Please refer to FIG. 2, which is an equivalent circuit of the fast Ethernet device in FIG. 1. The circuit equivalence of the DAC 108 and the echo cancellation device 110 of the transmitter 104 are current sources Id and Ic respectively. For the receiver 106 to achieve echo cancellation, the output of the current sources Ic and Id must cancel the adverse effects caused by the transmitter 106.

Please refer to FIG. 3, which is a model of the equivalent circuit in FIG. 2. Zo is the effective output impedance which in FIG. 2 includes a matching resistor Rm for matching impedance and an effective resistor Rc of the channel. Vo is the output signal which is the transmitted signal from the transmitter 104 and is also the received signal from the receiver 106. From the circuit in FIG. 3, we can draw the following formula:

$$Vi = \frac{-Zi[IdZo + (Zo + Rp)Ic]}{Rp + Zi + Zo} \quad (1)$$

in order to cancel echo, set vi=0, which satisfies:

$$IdZo+(Zo+Rp)Ic=0 \quad (2)$$

therefore the relationship between Ic and Id is:

$$Ic = \frac{-Zo}{Rp + Zo}Id \quad (3)$$

to accomplish echo cancellation.

The disadvantages of conventional echo cancellation device is that the effective output impedance Zo is seen as a pure load resistor Re, where the resistance characteristics are based on the matching resistor Rm and the effective resistor Rc. Besides the matching resistor Rm and the effective resistor Rc of the channel, the effective output impedance is also affected by the parasitic capacitance Ce that is unavoidable during operation of the circuit. If the effective output impedance is seen purely as a load resistor Re, echo cancellation cannot be effectively reduced to the lowest.

SUMMARY OF INVENTION

It is therefore one of the objects of the claimed invention to provide an echo cancellation device for a full duplex communication system that can effectively cancel echo impairment to solve the above-mentioned problem.

According to the claimed invention, an echo cancellation device for a full duplex communication system is provided. The full duplex communication system comprises a transmitter for transmitting a transmit signal and a receiver for receiving a receive signal. The echo cancellation device comprises: a filter for filtering the transmit signal; at least an echo cancellation resistor electrically coupled to the transmitter, the receiver, and the echo cancellation device; and an echo residue detection circuit for generating a control signal to control the filter according to the echo residue.

These and other objectives of the claimed invention will no doubt become obvious to those of ordinary skill in the art after reading the following detailed description of the preferred embodiment that is illustrated in the various figures and drawings.

DETAILED DESCRIPTION

Figure 1:
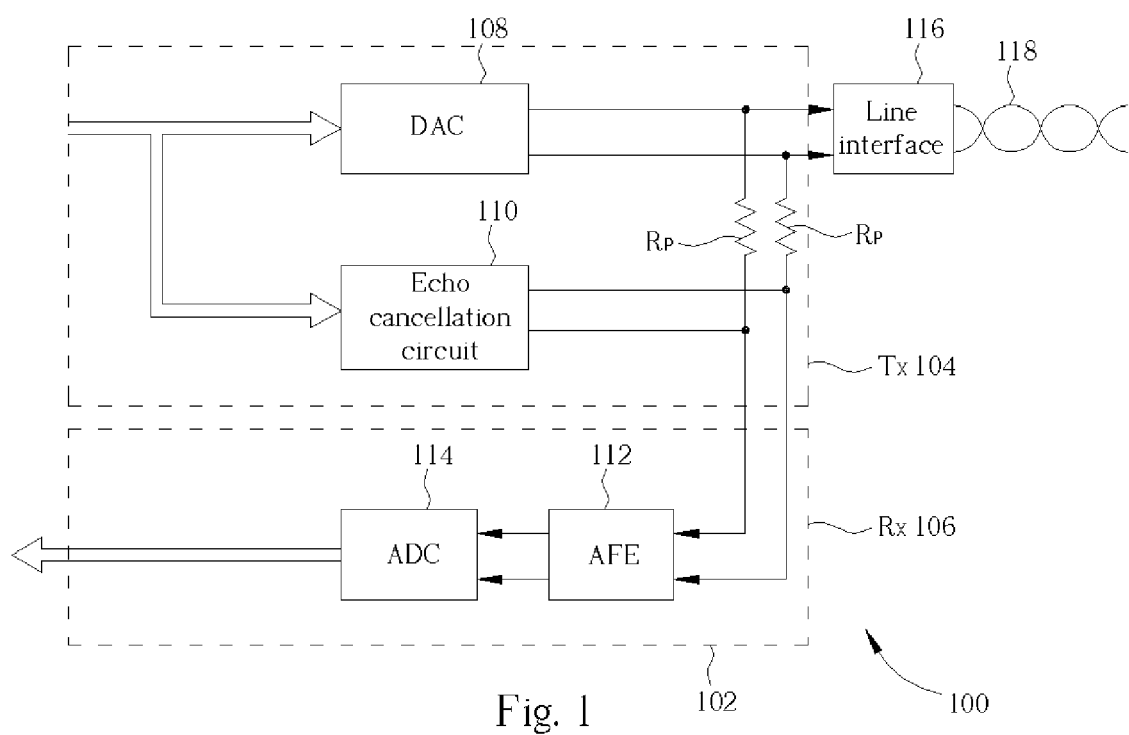
FIG.1 is a block diagram of a 1 Gbps fast Ethernet device according to the embodiment of the present invention.
Figure 2:
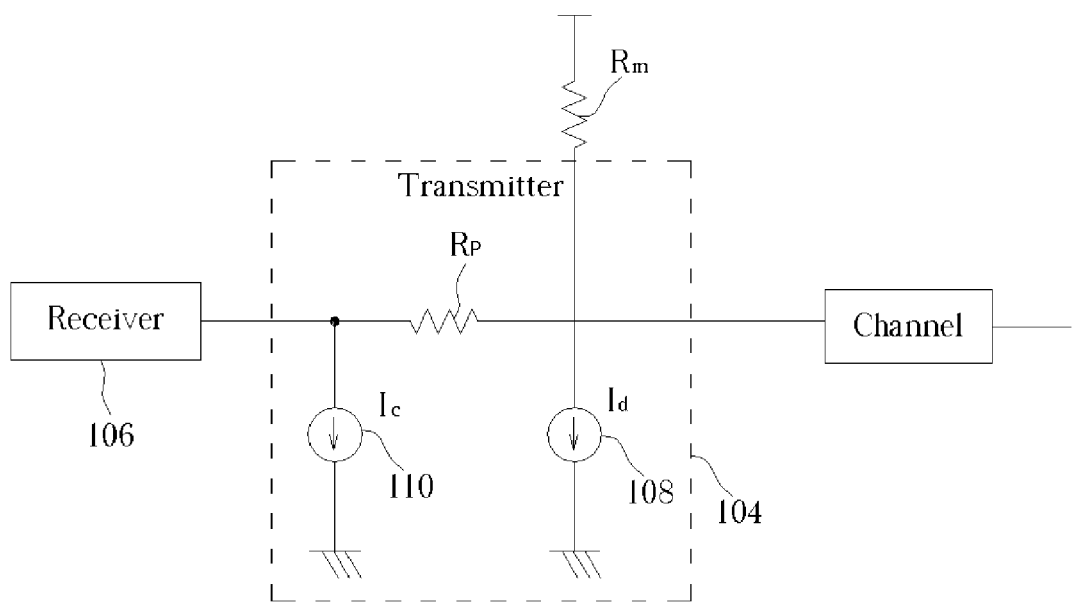
FIG. 2 is an equivalent circuit of the fast Ethernet device in FIG. 1.
Figure 3:
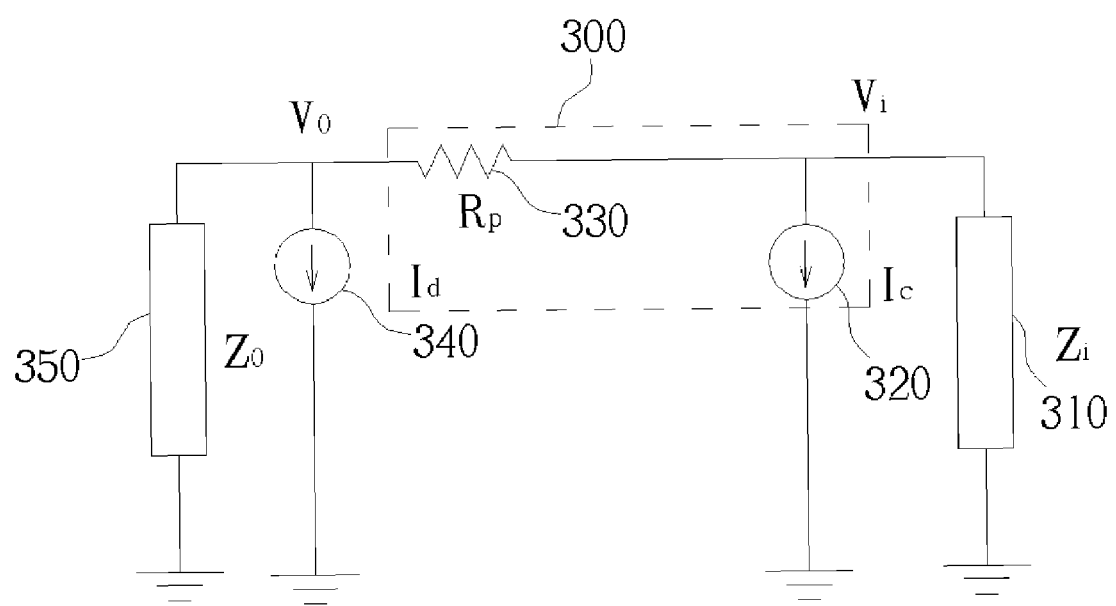
FIG. 3 is a small signal model for the equivalent circuit in FIG. 2.

Please refer to FIG. 3, the present invention takes into consideration the unavoidable parasitic capacitance in a practical circuit. The effective output impedance Zo is the parallel of the parasitic capacitance Ce and the load resistor Re, which is made up of the matching resistor Rm and the channel effective resistor Rc. The effective output impedance Zo is calculated by the following equation:

$$Zo = \frac{Re}{sReCe + 1} \quad (4)$$

substitute formula (4) into formula (3) to obtain formula (5):

$$Ic = \frac{-Re}{Rp + Re + sReRpCe} Id = H(s) \cdot Id \quad (5)$$

Figure 4:
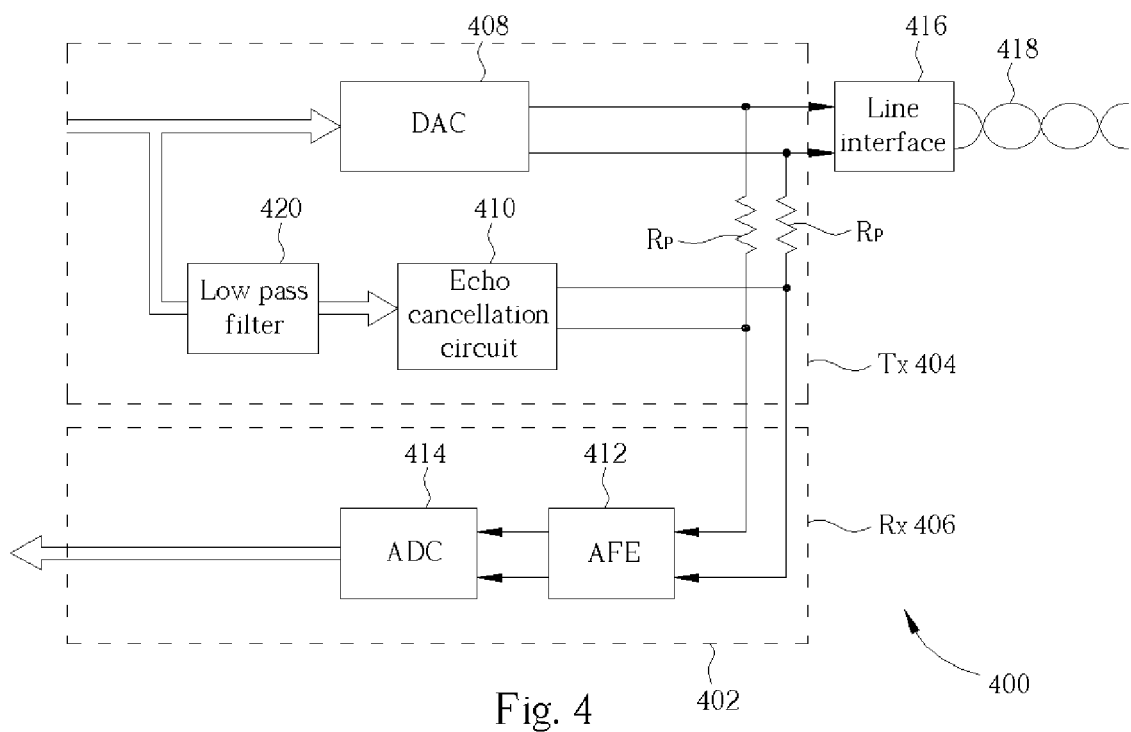
FIG. 4 is a block diagram of the fast Ethernet device according to the embodiment of the present invention.
Figure 5:
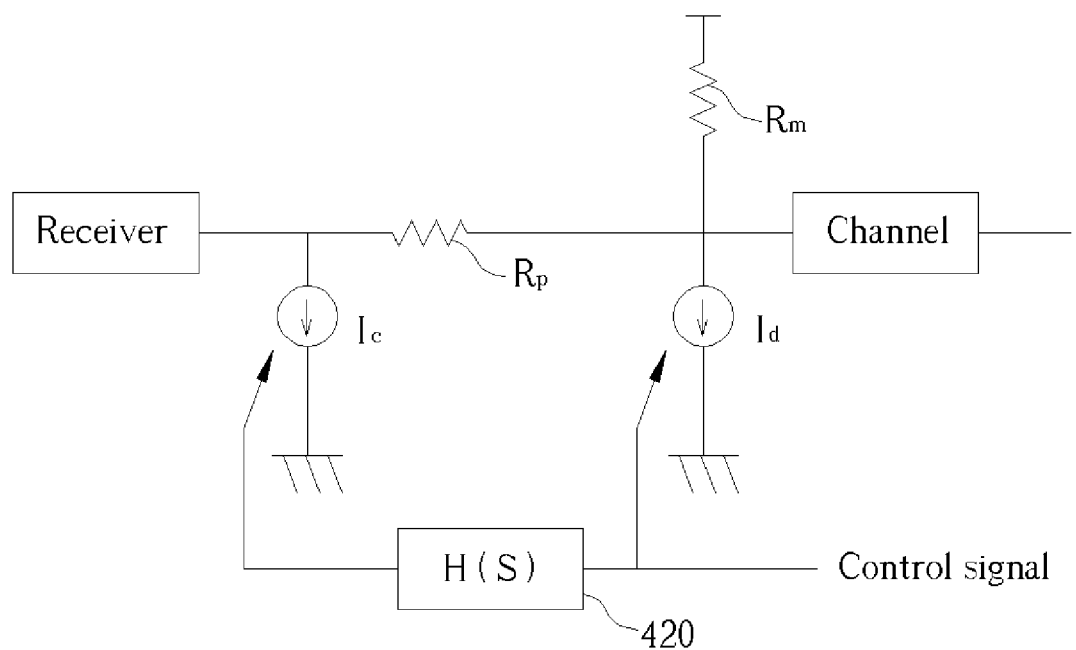
FIG. 5 is a schematic diagram of the digitally implemented low pass filter in FIG. 4.
Figure 6:
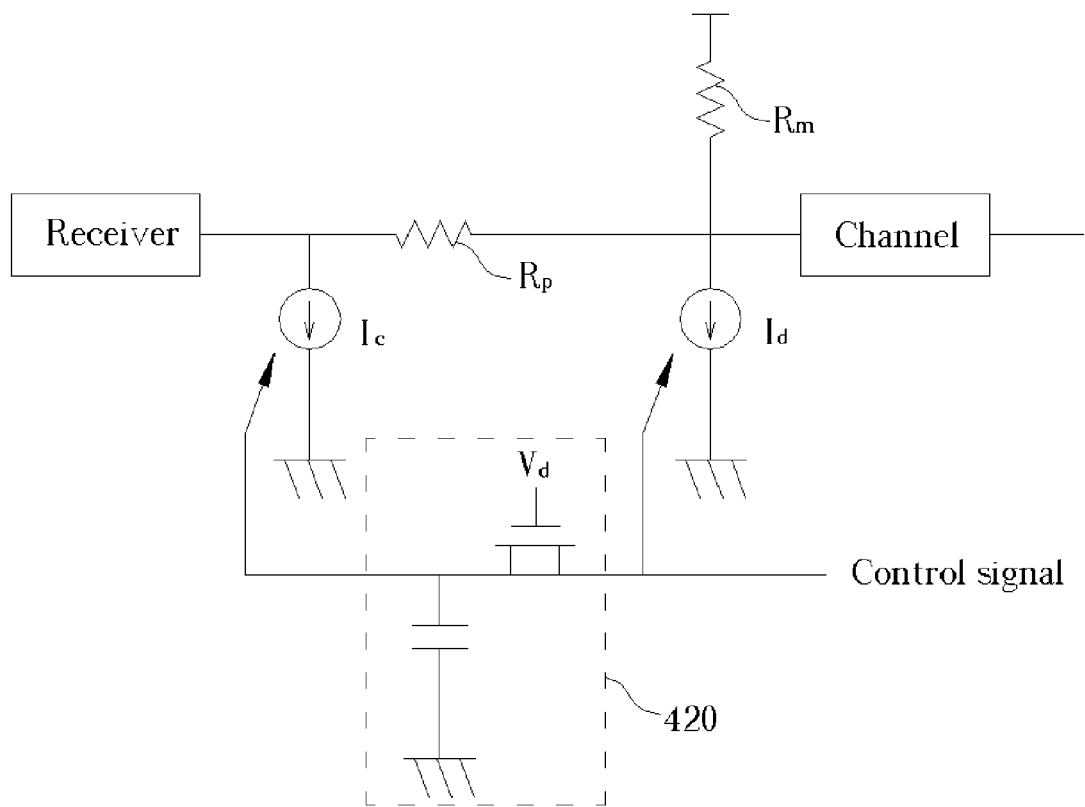
FIG. 6 is a schematic diagram of the analogly implemented low pass filter in FIG. 4.

From formula (5), it is known that the relationship between Ic and Ic is defined by a low pass transfer function. Please refer to FIG. 4, which shows a block diagram of the fast Ethernet device according to the first embodiment of the present invention. The echo cancellation device of the embodiment of the present invention comprises: an echo cancellation circuit 410 for generating a cancellation signal that corresponds to the transmit signal from the DAC 408; an echo cancellation resistor Rp electrically coupled between the transmitter 404 and the receiver 406; and a low pass filter 420 electrically coupled to the echo cancellation circuit 410 as a front-end circuit. The echo cancellation circuit 410 can be a DAC and the low pass filter 420 can be implemented either analogly or digitally. The digital low pass filter 420 is shown in FIG. 5 and the analog low pass filter 420 is the RC network low pass filter which is shown in FIG. 6. The low pass filter 420 allows the cancellation signal outputted by the echo cancellation circuit 410 to cancel the transmit signal from the DAC 408 (the current source Id in the circuit) so echo impairment of the receiver 406 is reduced to a minimum. The capacitor in FIG. 6 can be a metal-stacked layer capacitor or a parasitic capacitor and the resistor can be a MOS transistor where the equivalent resistance of the MOS transistor is controlled by the Vd of the gate electrode.

Figure 7:
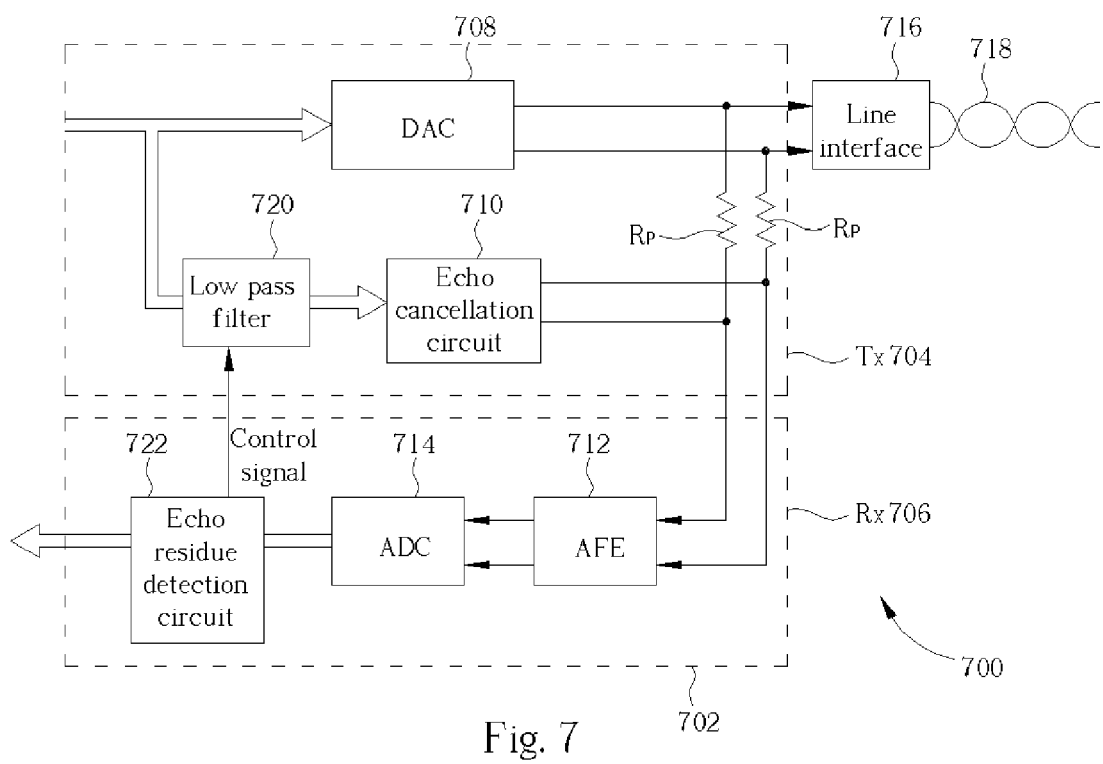
FIG. 7 is a block diagram of the fast Ethernet device according to another embodiment of the present invention.

Please refer to FIG. 7, which is a block diagram of the fast Ethernet device according to a second embodiment of the present invention. In practical operation, the capacitance of the parasitic capacitor Ce, the channel effective resistor Rc, and the impedance matching resistor Rm are affected by the operating environment, temperature, manufacturing deviations, and the like, therefore the values will fluctuate and change when transmitting/receiving data. In order to more precisely eliminate echo, in the second embodiment of the present invention, the receiver 706 further comprises an echo residue detection circuit 722 for detecting the amount of echo residue at the receiver 706. The echo residue detection circuit 722 outputs a control signal to the low pass filter 720 according to the detected echo residue to form a loop. The digitally implemented low pass filter 720 takes the adjustment of the coefficients of a finite impulse response (FIR) or a infinite impulse response (IIR) and the analogly implemented low pass filter 720 takes the adjustment of the RC value of the low pass RC filter by controlling the gate voltage Vd to actively adjust the low pass filter 720 according to the different characteristics of circuit components and network environment to maintain the best echo cancellation performance.

Those skilled in the art will readily observe that numerous modifications and alterations of the device may be made while retaining the teachings of the invention. Accordingly, that above disclosure should be construed as limited only by the metes and bounds of the appended claims.

What is claimed is:

1. An echo cancellation device for use in a full duplex communication system, wherein the full duplex communication system comprises a transmitter for transmitting a transmit signal and a receiver for receiving a receive signal, the echo cancellation device comprising:
   a filter for outputting a filtering signal according to the transmit signal;
   an echo cancellation circuit electrically coupled to the filter for outputting an echo cancellation signal according to the filtering signal; and
   at least an echo cancellation resistor electrically coupled to the transmitter, the receiver, and the echo cancellation circuit;
   wherein the filter has a transfer function, and the transfer function is corresponding to a parasitic capacitance.

2. The echo cancellation device of claim 1, wherein the echo cancellation signal corresponds to the transmit signal.

3. The echo cancellation device of claim 1 further comprising a digital-to-analog converter.

4. The echo cancellation device of claim 1, wherein the filter further comprises a digital low pass filter.

5. The echo cancellation device of claim 1, wherein the filter further comprises an analog low pass filter.

6. The echo cancellation device of claim 1 further comprising an echo residue detection circuit for outputting a control signal to control at least a characteristic of the filter according to an echo residue received by the receiver.

7. The echo cancellation device of claim 6, wherein the filter is a finite impulse response (FIR) filter and the characteristic is at least a coefficient of the FIR filter.

8. The device of claim 6, wherein the filter is a infinite impulse response (IIR) filter and the characteristic is at least a coefficient of the IIR filter.

9. The echo cancellation device of claim 6, wherein the filter is a resistor-capacitor (RC) network low pass filter and the characteristic is the resistance of the resistor or the capacitance of the capacitor.

10. An echo cancellation device for use in a full duplex communication system, wherein the full duplex communication system comprises a transmitter for transmitting a transmit signal and a receiver for receiving a receive signal, the echo cancellation device comprising:
    a filter for outputting a filtering signal according to the transmit signal;
    an echo cancellation circuit electrically coupled to the filter for outputting an echo cancellation signal according to the filtering signal;
    at least an echo cancellation resistor electrically coupled to the transmitter, the receiver, and the echo cancellation circuit; and
    an echo residue detection circuit for outputting a control signal to adjust the filter according to an echo residue received by the receiver;
    wherein the filter has a transfer function, and the transfer function is corresponding to a parasitic capacitance.

11. The echo cancellation device of claim 10, wherein the echo cancellation signal corresponds to the transmit signal.

12. The echo cancellation device of claim 10 further comprising a digital-to-analog converter.

13. The echo cancellation device of claim 10, wherein the filter further comprises a digital low pass filter.

14. The echo cancellation device of claim 13, wherein the digital low pass filter is a finite impulse response (FIR) filter and the FIR filter is adjusted through adjusting at least a coefficient of the FIR filter.

15. The echo cancellation device of claim 13, wherein the digital low pass filter is a finite impulse response (IIR) filter and the IIR filter is adjusted through adjusting at least a coefficient of the IIR filter.

16. The echo cancellation device of claim 10, wherein the filter further comprises a RC network filter.

17. The echo cancellation device of claim 16, wherein the RC network filter further comprises a resistor.

18. The echo cancellation device of claim 17, wherein the resistor is implemented by a MOS transistor.

19. The echo cancellation device of claim 18, wherein the RC network filter is adjusted through adjusting a gate voltage applied to the gate electrode of the MOS transistor.

20. The echo cancellation device of claim 16, wherein the RC network filter comprises a capacitor.

21. The echo cancellation device of claim 20, wherein the capacitor comprises a parasitic capacitor.

22. The echo cancellation device of claim 20, wherein the RC network filter is adjusted through adjusting the capacitance of the capacitor.

* * * * *